United States Patent
Ueno et al.

(10) Patent No.: US 7,333,054 B2
(45) Date of Patent: Feb. 19, 2008

(54) INFORMATION PROCESSING DEVICE, POWER SUPPLY CONTROL METHOD, AND COMPUTER PROGRAM

(75) Inventors: Ichiro Ueno, Saitama (JP); Baiping Liao, Saitama (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 11/607,125

(22) Filed: Nov. 30, 2006

(65) Prior Publication Data

US 2007/0182627 A1  Aug. 9, 2007

(30) Foreign Application Priority Data

Dec. 7, 2005  (JP)  ............................. 2005-353012

(51) Int. Cl.
- *G01S 5/14*  (2006.01)
- *H04N 5/76*  (2006.01)
- *G03B 7/26*  (2006.01)
- *H04B 1/16*  (2006.01)

(52) U.S. Cl. ............................. 342/357.06; 348/231.2; 348/231.3; 348/552; 396/301; 396/302; 396/303; 396/310; 455/343.1; 455/343.2

(58) Field of Classification Search ........... 342/357.06; 348/231.2, 231.3, 552; 396/301–303, 310–321; 455/343.1, 343.2; 713/320, 323–324, 340
See application file for complete search history.

(56) References Cited

U.S. PATENT DOCUMENTS

| | | | | |
|---|---|---|---|---|
| 5,592,173 A | * | 1/1997 | Lau et al. | ................. 455/343.2 |
| 6,995,792 B1 | * | 2/2006 | Ogura | ......................... 396/310 |
| 2005/0275587 A1 | * | 12/2005 | Siegel et al. | ............ 342/357.06 |

* cited by examiner

*Primary Examiner*—Thomas H. Tarcza
*Assistant Examiner*—Fred H. Mull
(74) *Attorney, Agent, or Firm*—Lerner, David, Littenberg, Krumholz & Mentlik, LLP

(57) ABSTRACT

An information processing device includes a global positioning system (GPS) device configured to execute position calculation processing based on data received from a satellite; a power supply controller configured to control power supply to the GPS device; and a device controller configured to monitor a state of use of the information processing device by a user, to calculate a use frequency of the information processing device per unit time, and to cause the power supply controller to intermittently supply power to the GPS device if the calculated use frequency is lower than a predefined threshold value.

13 Claims, 8 Drawing Sheets

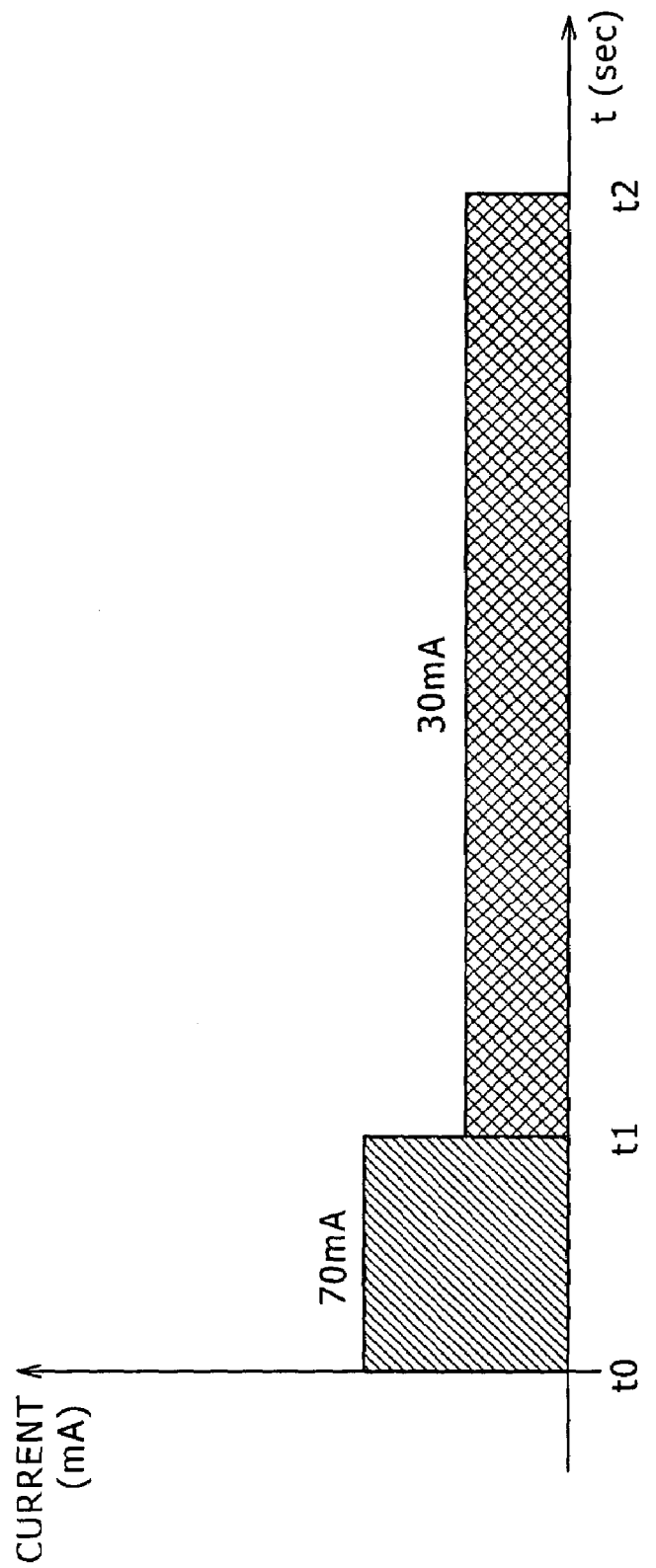

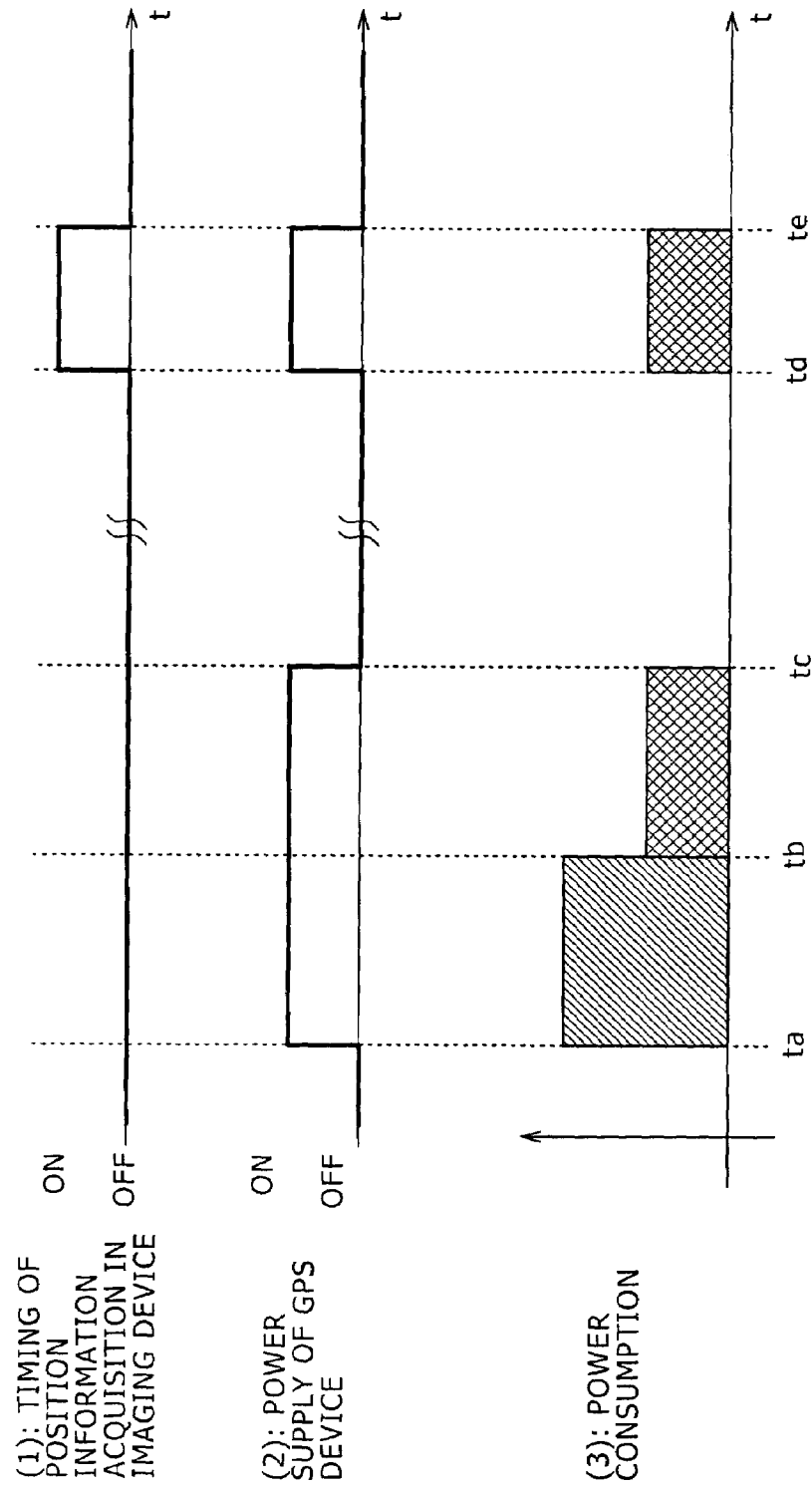

INFORMATION PROCESSING DEVICE, POWER SUPPLY CONTROL METHOD, AND COMPUTER PROGRAM

CROSS-REFERENCE TO RELATED APPLICATIONS

The present application claims priority from Japanese Patent Application No. JP 2005-353012 filed on Dec. 7, 2005, the disclosure of which is hereby incorporated by reference herein.

BACKGROUND OF THE INVENTION

1. Field of the Invention

The present invention relates to an information processing device, a power supply control method, and a computer program. More specifically, the invention relates to an information processing device, a power supply control method, and a computer program that each realize reduced power consumption in a device that executes position measurement by employing a global positioning system (GPS).

2. Description of Related Art

In recent years, systems have been realized in which portable information processing devices, imaging devices and so on are equipped with a global positioning system (GPS) and thus are allowed to acquire present position information. These systems employ acquired position information to thereby execute data processing such as navigation processing and processing of adding the imaging position of a captured image as attribute data for the captured image.

In general, these application products of the GPS technique, such as handy GPS devices and car navigation devices, have a configuration in which a GPS reception module is always supplied with power so that signals from satellites are continuously received and analyzed when the apparatus is being used. However, portable information terminals and imaging devices such as video cameras and still-image cameras employ a cell as a power source, and hence it is an important challenge for these terminals and devices to suppress power consumption.

For an apparatus that employs a cell as its power source and includes a GPS reception module, continuous supply of power to the GPS reception module leads to a problem that excessive power consumption is caused and therefore the cell is exhausted soon. As one of solutions to reduce this power consumption, a system would be available that employs execution of the necessary minimum energization for the GPS reception module, such as intermittent energization and intermittent driving therefor. However, the intermittent driving causes a problem that the waiting period from activation of the GPS module until acquisition of position information is increased.

To decrease the waiting period until position acquisition, it is necessary to effectively utilize navigation message information of a GPS satellite, called navigation data and received by the GPS module from the satellite, to thereby complete satellite acquisition, i.e., processing of reception of electric waves from the satellite, in a short period. However, navigation messages have the expiration time defined as the validity period (validity periods of almanac data and ephemeris data included in navigation messages are three months and two hours, respectively).

In a configuration that continuously receives navigation messages, constant data updating is allowed and thus navigation messages (almanac data and ephemeris data) within the validity period are stored so that rapid satellite acquisition is permitted by use of the stored navigation messages. However, when the above-described intermittent driving is implemented, there is a case where data recorded in the GPS module has expired. In this case, efficient satellite acquisition by use of these data cannot be carried out, which requires execution of a satellite acquisition process that takes comparatively long processing time. As a result, the period from activation of the GPS module to acquisition of position information is greatly extended, which possibly causes a problem that timely position information cannot be acquired.

For example, in a configuration in which a GPS module is provided for a video camera or still-image camera and processing for adding position information acquired from the GPS module as attribute information of imaging data is executed, it is required that accurate position information is obtained at the timing when a user starts imaging. However, if the period from activation processing to acquisition of position information is extended due to the above-described intermittent operation, a problem that accurate position information corresponding to imaging data cannot be obtained occurs.

SUMMARY OF THE INVENTION

The present invention is made in view of the above-described problem, and there is a need for the invention to provide an information processing device, a power supply control method, and a computer program that each implement, for an information processing device equipped with a GPS module, control of power supply to the GPS module depending on the state of use of the information processing device by a user to thereby allow power consumption reduction and allow the speed of processing of acquiring position information from the GPS module to be enhanced depending on the state of use by a user.

According to a first embodiment of the present invention, there is provided an information processing device that includes a global positioning system (GPS) device configured to execute position calculation processing based on data received from a satellite; a power supply controller configured to control power supply to the GPS device; and a device controller configured to monitor the state of use of the information processing device by a user, to calculate a use frequency of the information processing device per unit time, and to cause the power supply controller to intermittently supply power to the GPS device if the calculated use frequency is lower than a predefined threshold value.

According to a second embodiment of the invention, there is provided a power supply control method in an information processing device including a global positioning system (GPS) device. The method includes monitoring the state of use of the information processing device by a user and calculating a use frequency of the information processing device per unit time; and controlling power supply so that power is intermittently supplied to the GPS device if the calculated use frequency is lower than a predefined threshold value.

According to a third embodiment of the invention, there is provided a computer program for causing execution of a power supply control method in an information processing device including a global positioning system (GPS) device. The power supply control method includes monitoring the state of use of the information processing device by a user and calculating a use frequency of the information processing device per unit time; and controlling power supply so that power is intermittently supplied to the GPS device if the calculated use frequency is lower than a predefined threshold value.

The computer program according to the third embodiment can be provided by a storage medium such as a CD, FD or MO, or a communication medium such as a network that provides a program in a computer-readable format to a general-purpose computer system capable of executing various program codes. Providing such a program in a computer-readable format allows realization of processing on the computer system in accordance with the program.

Still other objects, features and advantages of the present invention will become apparent from the following more detailed description based on an embodiment of the invention and the accompanying drawings. The term "system" in the present specification refers to a logical assembly entity of plural devices, and is not limited to an entity in which devices with the respective configurations are included in the same casing.

According to one embodiment of the invention, in an information processing device including a global positioning system (GPS) device, such as an imaging device typified by a video camera, the state of use of the information processing device by a user, such as the frequency of imaging by the imaging device, is monitored so that the use frequency per unit time can be calculated. If the use frequency is lower than a predefined threshold value, power is intermittently supplied to the GPS device. Due to this configuration, unnecessary power consumption in the GPS device is prevented, which suppresses consumption of a battery. Furthermore, the intermittent driving of the GPS device makes it possible to maintain navigation messages, which are data received from GPS satellites, as ones within the validity period. Therefore, position calculation in a short period by use of the navigation messages is allowed without a new search for GPS satellites.

BRIEF DESCRIPTION OF THE DRAWINGS

FIG. 7 is a diagram for explaining the amount of power consumption in a GPS device; and FIG. 8 is a diagram for explaining the amount of power consumption in a GPS device.

DETAILED DESCRIPTION

Details of an information processing device, a power supply control method, and a computer program according to an embodiment of the invention will be described below with reference to the drawings.

Figure 1:
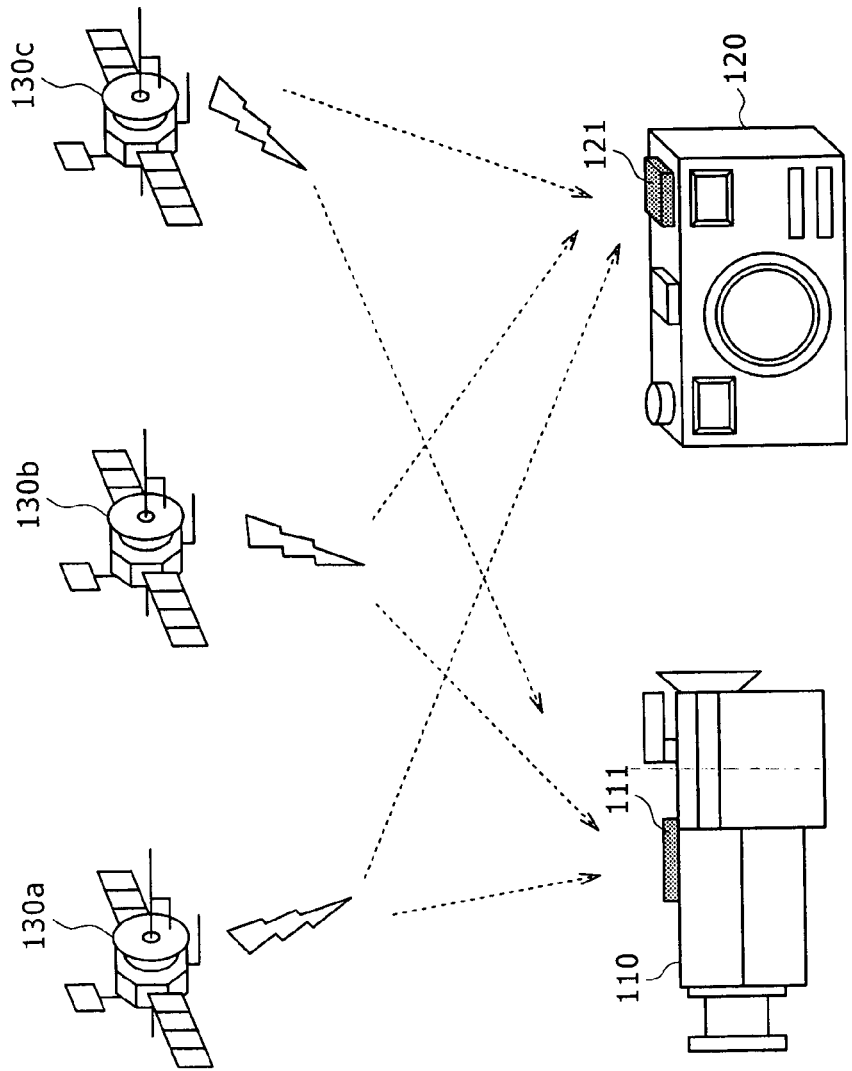
FIG. 1 is a diagram for explaining the outline of processing executed by an information processing device according to an embodiment of the present invention.

Initially, the outline of processing executed by an information processing device according to the embodiment will be described with reference to FIG. 1. FIG. 1 illustrates imaging devices as examples of the information processing device according to the embodiment. The imaging devices shown in the drawing are a video camera 110 that mainly captures moving images and a still camera 120 that captures still images. These imaging devices have GPS modules 111 and 121 on the apparatus main body.

The GPS modules 111 and 121 are formed of e.g. a packaged module that includes an antenna for receiving GPS electric waves, a signal converter for received electric waves, a position information calculator, a temporary storage for calculation results, and a communication unit for executing communication with a controller (CPU) in the main unit of the information processing device (imaging device).

The GPS modules 111 and 121 of the respective imaging devices receive electric waves from GPS satellites 130a, 130b, 130c . . . that exist in outer space and transmit GPS position information, to thereby acquire the present latitude/longitude coordinates on the earth and the time of the reception. The principle of the reception is the same as that of a general GPS reception system.

From each of plural GPS satellites existing in outer space, a navigation message that includes position information indicating the position of the GPS satellite in outer space and time information is transmitted. The GPS modules 111 and 121 determine the position information from the navigation message. The navigation message transmitted from the GPS satellite in outer space contains astronomical almanac data (almanac and ephemeris) as the position information of the satellite and signal transmission time information.

The GPS modules 111 and 121 obtain the three-dimensional positions (x, y, z) of the GPS modules 111 and 121 as the position information. To obtain the three-dimensional position, processing of acquiring at least three GPS satellites is necessary. Specifically, it is necessary to receive navigation messages from at least three GPS satellites of which positions have been identified. Subsequently, by using the information (navigation message) received from these at least three GPS satellites, the positions of the GPS modules 111 and 121 are determined by use of a triangulation method.

The processing for determining the present position of the GPS receiver by use of a triangular method includes two processing steps: Step 1 for GPS satellite acquisition processing and Step 2 for GPS module position determination processing. In Step 1, data is received from at least three GPS satellites from which the GPS modules 111 and 121 can receive navigation messages, so that the positions of the respective GPS satellites are identified. In Step 2, the distances from the GPS modules 111 and 121 to the respective GPS satellites are calculated, so that the positions of the GPS modules with respect to the center of the earth are calculated based on a triangular method.

Of the above-described steps, the processing of Step 2 can be executed through arithmetic processing in the GPS module. In the processing of Step 1, i.e., in the processing of receiving data from at least three GPS satellites from which navigation messages can be received to thereby identify the positions of the respective GPS satellites, acquiring rough position information of the GPS satellites in advance and using the acquired information is effective for shortening of the processing time.

As described above, a navigation message transmitted from a GPS satellite contains astronomical almanac data (almanac and ephemeris) as the position information of the satellite. Therefore, when a GPS module receives data continuously or intermittently, the present position of the satellite can be estimated by using the data that has been already received in the past. If the data that has been received in the past can be utilized, GPS satellite acquisition, i.e., data reception from a GPS satellite, can be carried out efficiently in a short period. That is, the above-described GPS satellite acquisition processing of Step 1can be implemented rapidly.

However, navigation messages have the expiration time defined as the validity period (validity periods of almanac data and ephemeris data are three months and two hours, respectively). If data within the validity period is held, the present position of the satellite can be estimated by using the data that has been received in the past, and thus the processing of Steps 1 and 2 can be executed efficiently in a short period, which allows rapid calculation of the positions of the GPS modules 111 and 121. In contrast, if data within the validity period is not held, it is impossible to efficiently estimate the GPS position by use of already acquired data, and it is needed to implement a GPS satellite position search from zero. Such a position search is not able to shorten the processing time of Step 1. As a result, it takes a long time period to calculate positions by using the GPS modules 111 and 121.

If the GPS modules 111 and 121 are always operated to thereby continuously receive navigation messages, a navigation message within its validity period can be held always, which permits efficient GPS satellite acquisition. For this purpose, however, it is necessary that the GPS modules are continuously supplied with power so as to be driven. However, operating power for the GPS modules 111 and 121 of the imaging devices 110 and 120 is supplied from a cell (battery) of the imaging devices 110 and 120, and it is required that consumption of the cell is suppressed as much as possible.

The imaging devices 110 and 120 as examples of the information processing device according to the embodiment of the invention are to address this requirement, and are configured to control power supply to the GPS modules 111 and 121 depending on the state of use of the information processing device (imaging devices 110 and 120) by a user. Thus, power consumption can be reduced, and the speed of processing of acquiring position information from the GPS module can be enhanced depending on the state of use by a user.

Figure 2:
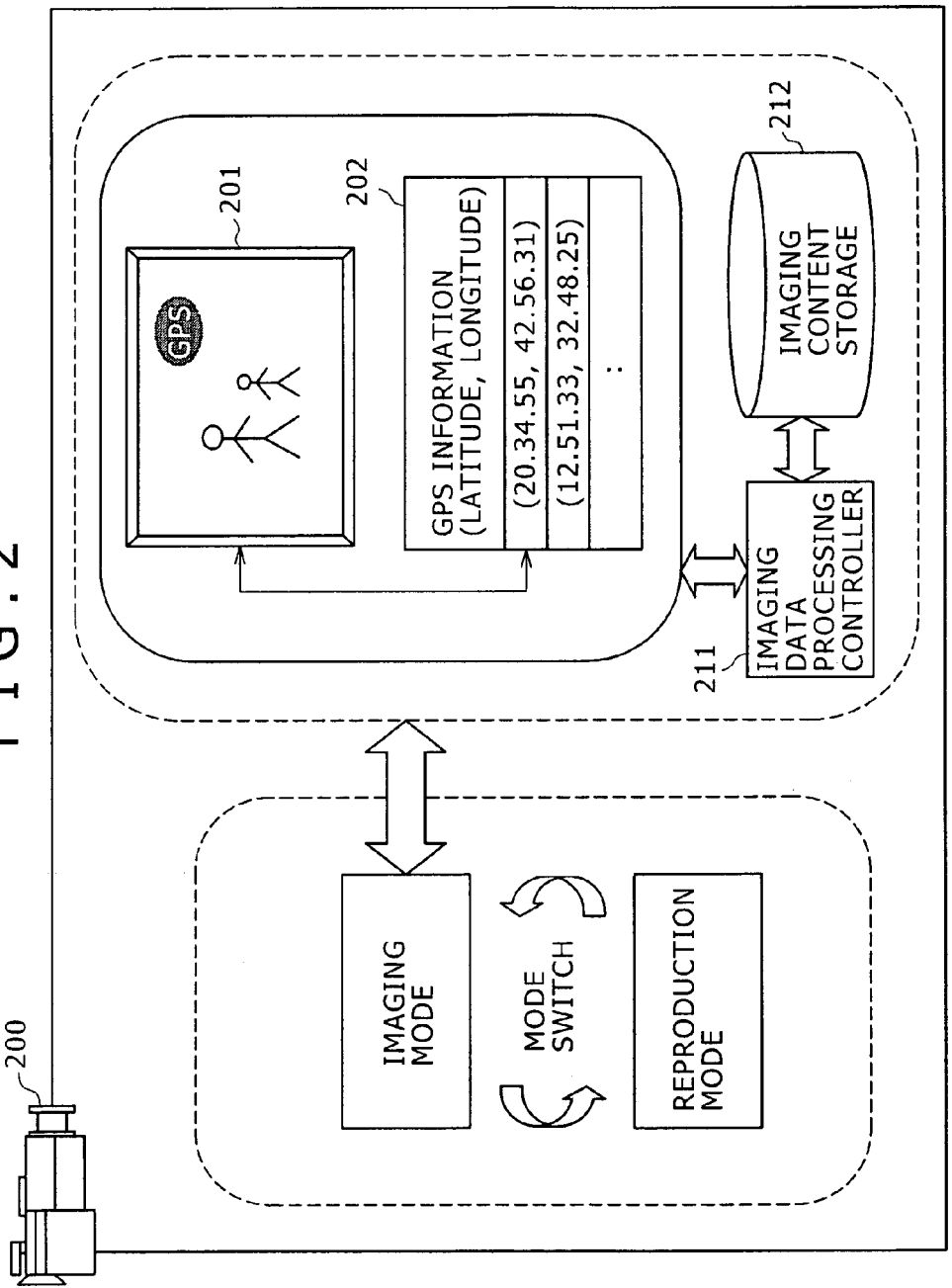
FIG. 2 is a diagram for explaining an example of data processing executed by an imaging device as an example of the information processing device of the embodiment.

Examples of data processing executed by an imaging device as an example of the information processing device according to the embodiment of the invention will be described below with reference to FIGS. 2 to 4. Referring initially to FIG. 2, an example of processing at the time of image capturing will be described below. As shown in the drawing, an imaging device 200 has, as its operation modes, an imaging mode to capture moving images or still images and a reproduction mode to reproduce data of captured images.

In the imaging mode, as shown in FIG. 2, image data 201 is acquired through imaging processing by the imaging device main unit, and position information (latitude and longitude) 202 of a GPS module is acquired by the GPS module. An imaging data processing controller 211 in the imaging device stores the data and information in an imaging content storage 212 with associating the data and information with each other. That is, the position information (latitude and longitude) 202 acquired by the GPS module is set as attribute data corresponding to image data and is stored in the imaging content storage 212.

Figure 3:
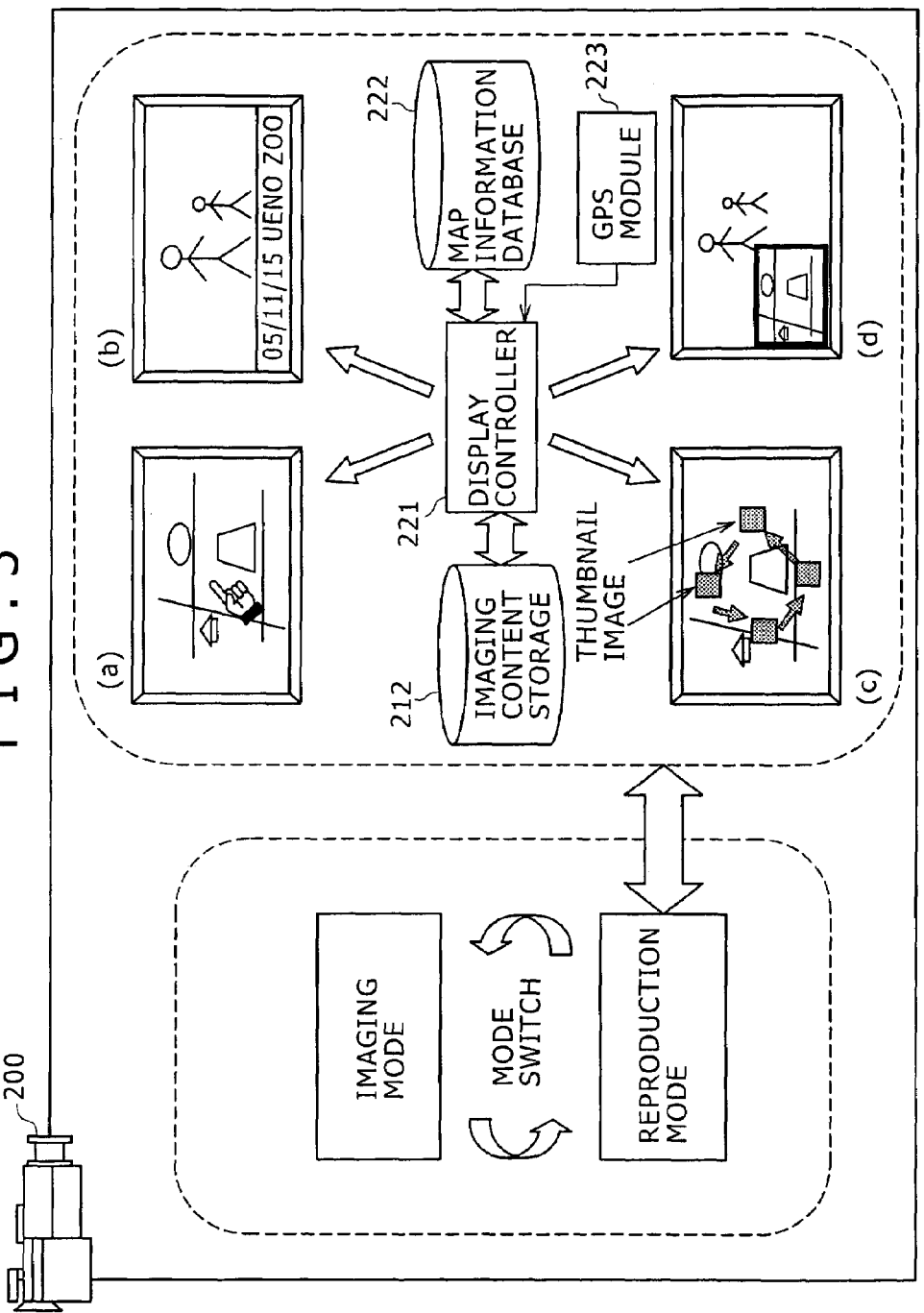
FIG. 3 is a diagram for explaining an example of data processing executed by the imaging device as an example of the information processing device of the embodiment.

Referring next to FIG. 3, an example of processing in the reproduction mode for reproducing data of captured images will be described below. FIG. 3 shows display data examples (a) to (d) that are displayed on the monitor of the imaging device in the reproduction mode. These display data (a) to (d) are created under control by a display controller 221 in the imaging device. The display controller 221 creates display data by acquiring the following data and information: data in the imaging content storage 212, i.e., image data and position information recorded as attribute data of the image data; information in a map information database 222 that includes data such as map, address, and imaging spot information as data associated with latitude/longitude information; and position information input from a GPS module 223.

The display data (a) corresponds to a display example in which map information is displayed on the monitor so that the present position information is offered to a user. This display example is obtained by inputting the present position information from the GPS module 223 and displaying information that clearly shows the present position on a map in accordance with the input position information. This example is equivalent to a display example for typical navigation information.

The display data (b) is an example in which captured image data stored in the imaging content storage 212 is displayed, and the imaging location is represented by characters in accordance with map data and spot information acquired from the map information database 222 based on the position information recorded with being associated with the image data as attribute data thereof.

The display data (c) is a display example in which captured image data stored in the imaging content storage 212 are arranged in the order of the imaging sequence so that transition of the imaging locations is indicated on a map. The imaging data are displayed on the map as thumbnail images.

The display data (d) is an example in which imaging data is displayed in combination with map data. Specifically, based on the position information recorded as attribute data of the imaging data, a map of the region corresponding to the position information is displayed on part of the monitor.

Figure 4:
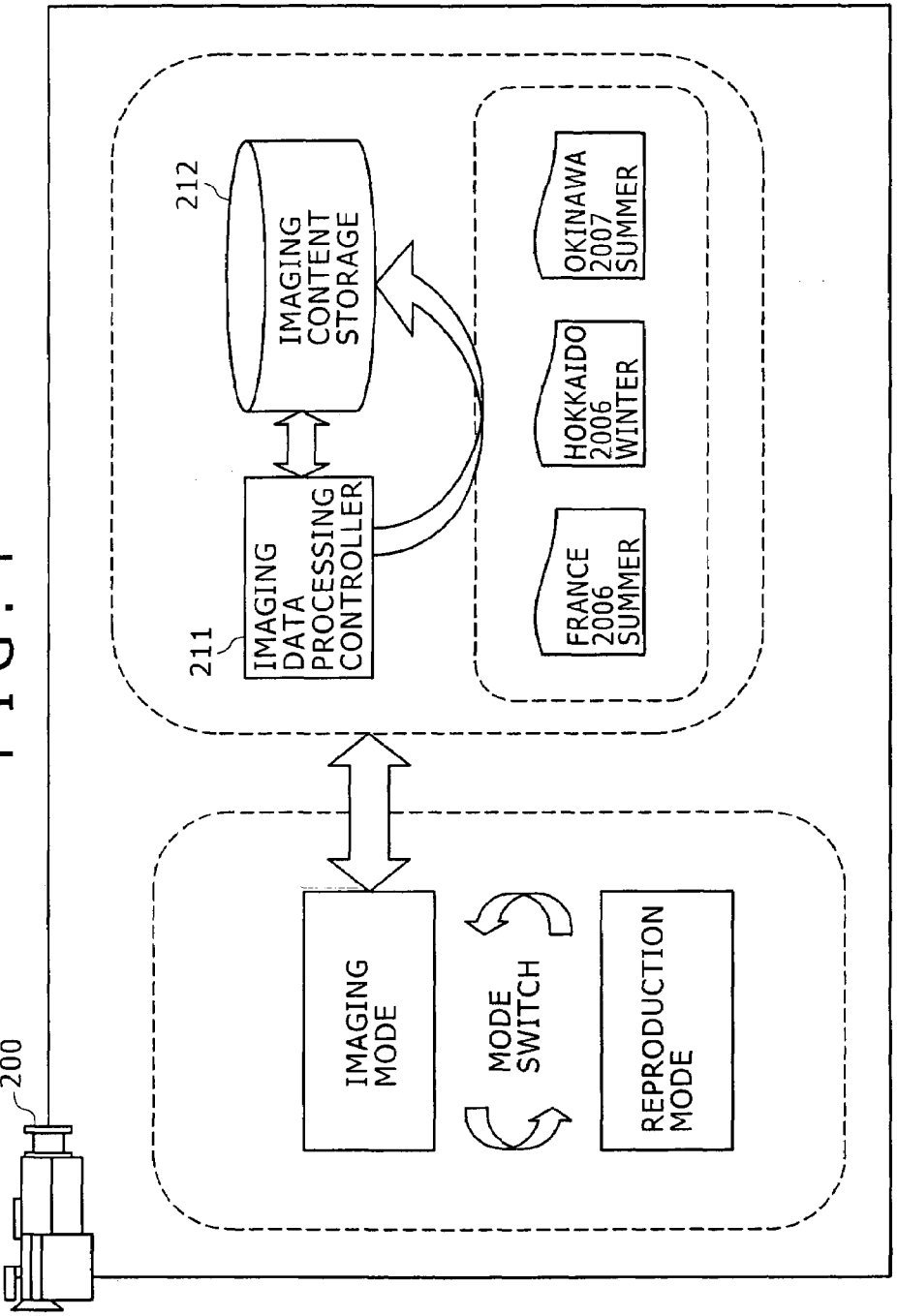
FIG. 4 is a diagram for explaining an example of data processing executed by the imaging device as an example of the information processing device of the embodiment.

Furthermore, in the imaging mode, it is possible to execute processing to, as shown in FIG. 4, collectively store imaging contents in the folder corresponding to the imaging location based on position information as attribute data corresponding to imaging data. For example, through processing in which the imaging data processing controller 211 stores data within a certain latitude/longitude range in one folder such as a folder for which a title of "France 2006 Summer" has been defined based on latitude/longitude information acquired as attribute information corresponding to captured images, imaging data corresponding to a specific region can be collectively stored in one folder. Alternatively, classification based on time information is also possible because imaging date-and-time data is also added to imaging data as attribute information.

In addition to the above-described examples of data processing executable by the imaging device, other various kinds of processing are also possible. For example, also in the imaging mode, it is possible that imaging by a user is assisted based on position information from the GPS module. Specifically, e.g. the following kinds of processing are available: processing of indicating on the monitor whether or not GPS electric waves can be received at the place where imaging is currently being implemented; processing of graphically representing the present position on a screen map like by a car navigation system; and processing of indicating place-name information of the present position on the imaging screen. These kinds of processing can be realized by causing the display controller 221 to execute the processing described with reference to FIG. 3 at the time of imaging.

Figure 5:
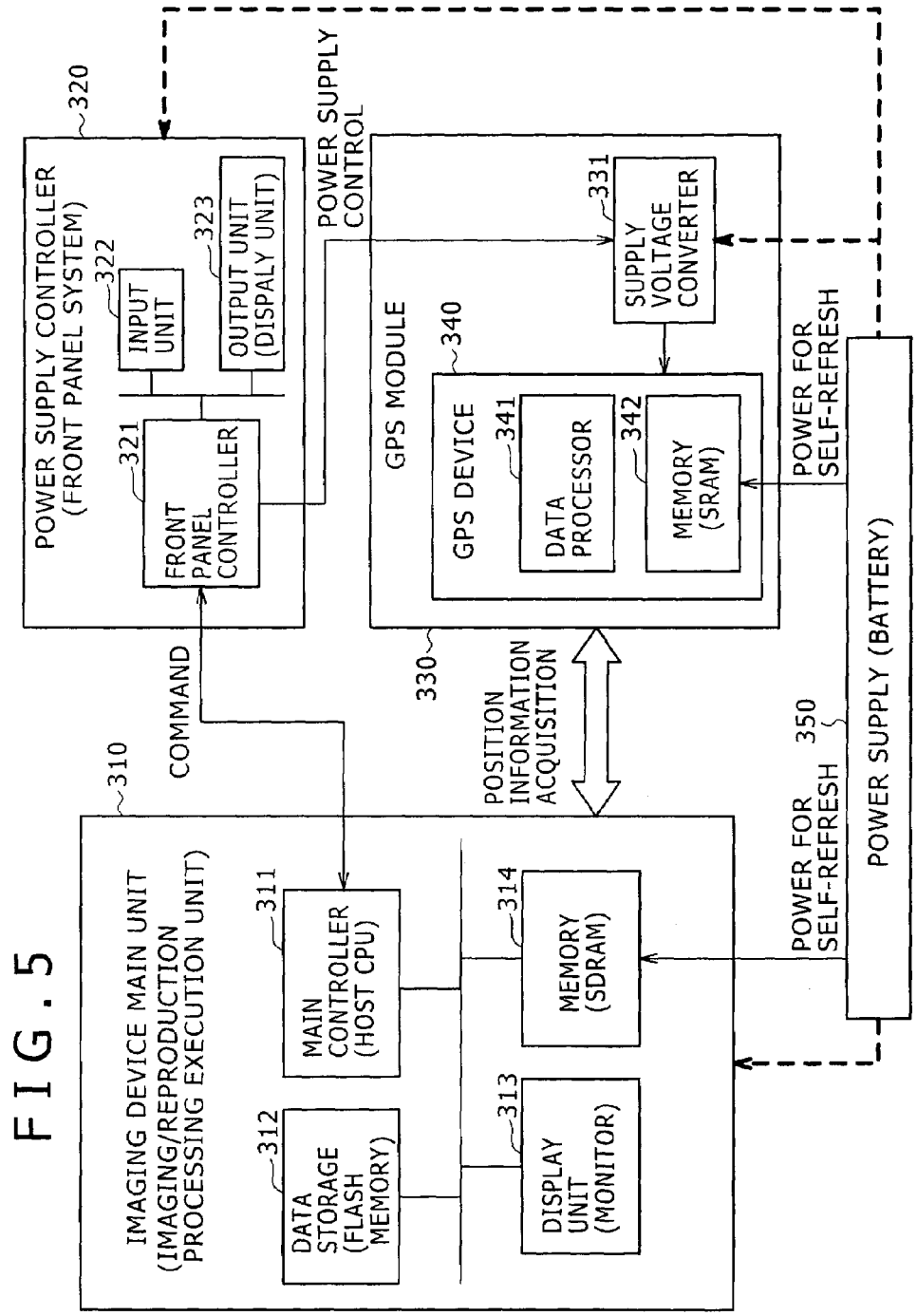
FIG. 5 is a diagram for explaining the configuration of the imaging device as an example of the information processing device of the embodiment.

Referring next to FIG. 5, the configuration of the imaging device as an information processing device according to the embodiment will be described below. In FIG. 5, the component parts of the imaging device including a GPS module are shown with being classified into an imaging device main unit 310, a power supply controller 320, a GPS module 330, and a power supply (battery) 350.

The imaging device main unit 310 has a function as a video camera or still camera, and has an imaging processing function and a reproduction processing function for imaging data. The imaging device main unit 310 includes a main controller (host CPU) 311, a data storage (flash memory) 312 in which imaging data and so on are recorded, a memory (SDRAM) 314 for temporary data storage, and a display unit (monitor) 313.

The power supply controller 320 is formed of e.g. a front panel system, and includes a front panel controller 321, an input unit 322 including various kinds of switches such as a power supply switch, and an output unit 323 that indicates imaging information and so on. The GPS module 330 includes a GPS device 340 and a supply voltage converter 331. The GPS device 340 is supplied with power arising from conversion into a predetermined voltage by the supply voltage converter 331 so as to be driven. The GPS device 340 executes satellite acquisition processing and navigation message acquisition processing, and includes a data processor 341 that executes navigation data record processing, position calculation processing and so on, and a memory (SRAM) 342 in which acquired navigation data and calculated position data are stored.

The power supply (battery) 350 supplies power to each of the imaging device main unit 310, the power supply controller 320 and the GPS module 330. Note that the supply of power to the GPS module 330 is controlled depending on the state of execution of imaging processing by a user as described later. Furthermore, power for self-refresh processing is supplied to the memory (SDRAM) 314 in the imaging device main unit 310 and the memory (SRAM) 342 in the GPS device 340.

A description will be made below on control of supply of power for driving the GPS device 340. The power for driving the GPS device 340 is input via the supply voltage converter 331 to the GPS device 340. This driving power is controlled based on the state of execution of imaging by a user, measured by the main controller (host CPU) 311 in the imaging device main unit 310.

The main controller (host CPU) 311 in the imaging device main unit 310 measures the frequency of imaging by a user. Furthermore, if it is determined by the controller 311 that imaging is being executed with a frequency higher than a predefined threshold value, the controller 311 outputs a control instruction (command) to the front panel controller 321 so that power is continuously supplied to the GPS device 340, and the front panel controller 321 controls the supply voltage converter 331 in the GPS module 330 so that power is continuously supplied to the GPS device 340. In the period of the continuous power supply, the GPS device 340 continuously receives navigation messages and executes position calculation processing.

In contrast, if it is determined by the main controller (host CPU) 311 in the imaging device main unit 310 that the frequency of imaging by a user is lower than the predefined threshold value, the controller 311 outputs a control instruction (command) to the front panel controller 321 so that continuous power supply to the GPS device 340 is stopped and intermittent power supply thereto is executed. The front panel controller 321 controls the supply voltage converter 331 in the GPS module 330 so that power is intermittently supplied to the GPS device 340. In this intermittent power supply period, the GPS device 340 intermittently receives navigation messages and executes position calculation processing.

Specifically, the GPS device 340 independently implements intermittent positioning operation irrespective of the ON/OFF state of the power supply of the imaging device main unit. If an instruction to turn on the power supply of the GPS device 340 is issued from the power supply controller (front panel system) 320, power is supplied from the supply voltage converter 331 to the GPS device and the GPS device 340 starts positioning operation.

A basic processing flow will be described below with reference to the configuration diagram shown in FIG. 5. Initially, when the power supply of the imaging device main unit 310 is turned on due to operation of the input unit 322 in the power supply controller (front panel system) 320 by a user, the GPS device 340 in the GPS module 330 is also powered up, i.e., is supplied with power in response to an instruction from the power supply controller (front panel system) 320.

When the supply of power is started, the GPS device 340 loads therein backup data of navigation data necessary for GPS satellite acquisition from the data storage 312 in the imaging device main unit 310 and utilizes the loaded data for GPS acquisition. Specifically, navigation data, i.e., almanac and ephemeris data, that has been acquired by the GPS device 340 in the past has been stored in the data storage 312 as a nonvolatile memory in the imaging device main unit 310. The GPS device 340 acquires these data to thereby carry out GPS satellite acquisition.

However, the data validity period is defined for the respective navigation data as described above. If the validity period of the data has expired, the GPS device 340 is not able to use these already acquired navigation messages and hence needs to carry out GPS satellite acquisition at random.

When the GPS device 340 has successfully acquired GPS satellites necessary for position information calculation, the latest navigation data acquired by the GPS device 340 and the calculated position information are input to the imaging device main unit 310. The controller 311 in the imaging device main unit 310 outputs a command to the power supply controller (front panel system) 320 so that the operation state of the GPS module 330 is switched to the intermittent operation state. In response to the instruction from the power supply controller (front panel system) 320, the state of the GPS module 330 is changed to the intermittent operation state. From then on, the GPS device 340 continues intermittent positioning operation independently of state transitions between the ON/OFF states of the power supply of the imaging device main unit 310.

During the intermittent positioning operation, the latest position information as positioning information based on navigation messages newly acquired by the data processor 341 in the GPS device 340 is stored in the memory (SRAM) 342 in the GPS device 340. When the power supply of the imaging device main unit 310 is turned on next time, the position information stored in the memory (SRAM) 342 in the GPS device 340 is read out by a GPS control application that operates on the imaging device main unit 310.

At the time of the reading-out of the data, the controller 311 determines whether or not the acquired position information and navigation messages are newer than the data held in the data storage 312 as a nonvolatile memory in the imaging device main unit 310. If the acquired information and navigation messages are newer, these newer acquired data are stored in the data storage 312 so that data updating is executed.

Figure 6:
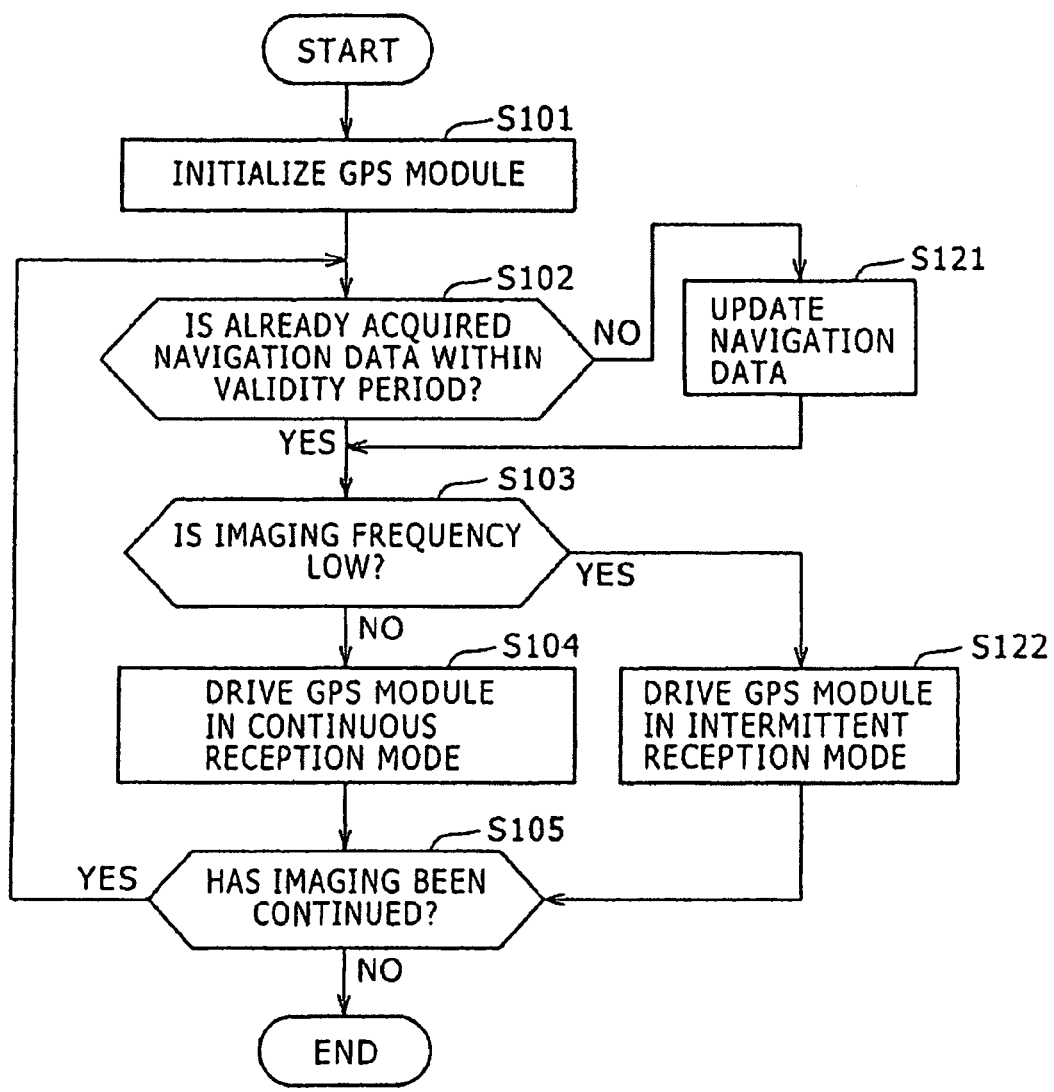
FIG. 6 is a diagram showing a flowchart for explaining the sequence of control of power supply to a GPS module, executed in the imaging device as an example of the information processing device of the embodiment.

Referring next to the flowchart shown in FIG. 6, a description will be made below on the sequence of control of power supply to the GPS module, executed in the imaging device as the information processing device according to the embodiment of the invention. The control processing in accordance with this flowchart is executed under control by the main controller (host CPU) in the imaging device main unit. Initially, upon powering-up of the imaging device by a user, initialization setting necessary for operation is carried out in the GPS module in a step S101.

After the GPS module has been initialized, in a step S102, under control by the main controller (host CPU) in the imaging device main unit, an application on the imaging device side queries the GPS module about the validity period of the latest navigation message stored in the memory by the GPS module and determines whether the already acquired navigation message is within its validity period or has expired.

If the navigation message has expired, the processing sequence proceeds to a step S121, where the GPS device is driven irrespective of the timing of imaging acts, so that updating of the navigation message is carried out. From then on, the application on the imaging device side monitors the frequency of imaging by a user. The application executed in the imaging device main unit holds a predefined imaging frequency threshold value, and compares this threshold value with the state of imaging processing actually carried out by a user. Specifically, the application monitors the state of imaging by a user, such as the number of captured images per one minute in still image capturing processing and the number of captured frames per one minute in moving image capturing processing, to thereby acquire imaging frequency data, and compares the acquired imaging frequency data with the threshold value held in advance.

If it is determined as a result of the comparison with the threshold value that the frequency of imaging by a user is low (step S103: Yes), the processing sequence proceeds to a step S122, where control is implemented so that the GPS device is intermittently driven in order to suppress power consumption. Specifically, power is intermittently supplied to the GPS device so that the GPS device intermittently receives navigation messages and executes position calculation.

More specifically, as described above with reference to FIG. 5, if it is determined by the main controller (host CPU) 311 in the imaging device main unit 310 that the frequency of imaging by a user is lower than the predefined threshold value, the controller 311 outputs a control instruction (command) to the front panel controller 321 so that continuous power supply to the GPS device 340 is stopped and intermittent power supply thereto is executed. The front panel controller 321 controls the supply voltage converter 331 in the GPS module 330 so that power is intermittently supplied to the GPS device 340. In this intermittent power supply period, the GPS device 340 intermittently receives navigation messages and executes position calculation processing.

In contrast, if it is determined as a result of the comparison with the threshold value that the frequency of imaging by a user is not low (step S103: No), the processing sequence proceeds to a step S104, where the GPS reception module is controlled so as to always implement satellite acquisition in order to acquire highly accurate position information that follows an imaging timing as closely as possible. Specifically, power is continuously supplied to the GPS device so that the GPS device continuously receives navigation messages and executes position calculation.

More specifically, the main controller (host CPU) 311 in the imaging device main unit 310 outputs a control instruction (command) to the front panel controller 321 so that power is continuously supplied to the GPS device 340, and the front panel controller 321 controls the supply voltage converter 331 in the GPS module 330 so that power is continuously supplied to the GPS device 340. In the period of the continuous power supply, the GPS device 340 continuously receives navigation messages and executes position calculation processing.

Thereafter, in a step S105, it is determined whether or not the imaging act by a user has been continued (the state where the imaging act has been continued includes also the state where the power supply of the imaging device is temporarily turned off). If the imaging has been continued, the processing of the step S102, i.e., the processing of checking the validity period of a navigation message, and subsequent steps are repeatedly executed again. Specifically, in the execution period of imaging processing, the controller in the imaging device main unit periodically verifies the validity period of an already acquired navigation message in the GPS device in the step S102. If the already acquired navigation message has expired, the processing sequence proceeds to the step S121, where the controller causes the GPS device to execute processing of updating navigation data.

If it is determined in the step S105 that the imaging act by a user has not been continued, because of e.g. the state where the power supply of the imaging apparatus has been turned off and kept at the OFF-state without being turned on again during a certain long period, power supply to the imaging device main unit and GPS module is stopped and the processing is ended.

A description will be made below regarding the amount of power consumption in a GPS device with reference to FIGS. 7 and 8. FIG. 7 shows the transition of the amount of power consumption in a GPS device when navigation messages are continuously acquired after turning-on of the power supply of the GPS device and execution of GPS satellite acquisition. Plotted on the abscissa and ordinate are the time t (sec) and the current amount (mA) corresponding to the amount of power consumption in the GPS device, respectively.

At time t0, power supply to the GPS device is started. This example is based on an assumption that at this timing (t0), already acquired navigation messages have expired and thus are not able to be used. In this case, the GPS device executes processing of acquiring plural GPS satellites necessary for position measurement. Specifically, the GPS device searches plural GPS satellites and receives navigation messages from GPS satellites found as a result of the search. For this processing, a current of about 70 mA is consumed.

Subsequently, if the GPS device successfully acquires GPS satellites and navigation messages within the validity period are recorded in a memory at time (t1), there is no need to search new GPS satellites from then on, and hence the mode of the GPS device can be switched to the tracking mode to follow the acquired GPS satellites. In this tracking mode, the GPS device is allowed to track the GPS satellites by using the navigation messages within the validity period, and the consumption current is decreased to about 30 mA. When the GPS device continuously receives navigation messages, it is required that a current of 30 mA is continuously supplied to the GPS device.

FIG. 8 shows an example in which power is supplied to a GPS device in the intermittent mode. (1) in FIG. 8 indicates the timing at which an application on the imaging device main unit side acquires position information from the GPS module. When being in the ON-state, the imaging device acquires position information from the GPS module. (2) in FIG. 8 indicates the transitions of the ON/OFF states of the power supply of the GPS device. In this example, the GPS device is in the intermittent mode, and the ON and OFF states thereof are switched in accordance with the predefined control timings of the intermittent mode. (3) in FIG. 8 shows the transition of the amount of power consumption in the GPS module.

At time (ta), power supply to the GPS device is started. This example is based on an assumption that at this timing (ta), similarly to the time (t0) of FIG. 7, already acquired navigation messages have expired and thus are not able to be used. In this case, the GPS device executes processing of acquiring plural GPS satellites necessary for position measurement. Specifically, the GPS device searches plural GPS satellites and receives navigation messages from GPS satellites found as a result of the search. For this processing, a current of about 70 mA is consumed.

Subsequently, if the GPS device successfully acquires GPS satellites and navigation messages within the validity period are recorded in a memory at time (tb), there is no need to search new GPS satellites from then on, and hence the mode of the GPS device can be switched to the tracking mode to follow the acquired GPS satellites. In this tracking mode, the GPS device is allowed to track the GPS satellites by using the navigation messages within the validity period, and the consumption current is decreased to about 30 mA.

If it is determined at time (tc) that the frequency of imaging by a user is lower than a predefined threshold value through monitoring processing by the application on the imaging device side, the mode of power supply to the GPS device is set to the intermittent mode, so that the power supply to the GPS device is stopped temporarily. Thereafter, at time td, which is the timing when the application issues a position information acquisition request to the GPS device, power supply to the GPS device is resumed, and thus power consumption in the GPS device arises at this timing.

However, unless the period during which power supply to the GPS device is stopped becomes a long period, already acquired navigation messages are kept as ones within the validity period. Thus, GPS satellite tracking by use of the navigation messages within the validity period can be implemented without a new search for GPS satellites. That is, navigation message reception in the tracking mode is allowed, which permits processing with low power consumption. If in the period from the time td to te, new navigation messages are successfully acquired, so that the navigation messages are stored in a memory and calculated position information is provided to the application, power supply to the GPS device is stopped, which makes power consumption zero. Due to the execution of processing in such an intermittent mode, power consumption is reduced. In addition, unless the period during which power supply to the GPS device is stopped becomes a long period, already acquired navigation messages are kept as ones within the validity period. Thus, new navigation messages can be acquired from GPS satellites in a short period by using the navigation messages within the validity period.

The timing of resumption of power supply to the GPS device (e.g., the time (td) in FIG. 8) is controlled by the controller in the imaging device main unit. In the example shown in FIG. 8, the timing of resumption of power supply to the GPS device is matched to the timing when position information is input to the imaging device main unit from the GPS device. However, the interval of turning ON/OFF of power supply to the GPS device in this intermittent control can be optionally set to any interval. For example, such setting that turning ON and OFF are repeated with a predefined constant interval is also available. In addition, the maximum duration of power-OFF of the GPS device may be set to a period shorter than the validity period of navigation messages. Such setting can always maintain the state where navigation messages within the validity period can be used.

In the description of the embodiment, a configuration example in which a GPS module is included in the imaging device has been explained. However, another configuration in which a GPS system is externally attached to the imaging device through USB connection or the like is also available as long as a power supply is shared by both the device main unit and GPS module. This configuration achieves a power reduction effect and more rapid position information acquisition processing.

In addition, in the description of the embodiment, a configuration example in which a power supply is shared by the GPS module and imaging device main unit has been explained. However, also in a configuration in which a power supply is separately provided for each of them, an effect of suppressing power consumption in the GPS module can be achieved. Moreover, the restart speed can be enhanced, which achieves more rapid position information acquisition processing.

Furthermore, although the above-described embodiment is applied to an imaging device, embodiments of the invention can be applied also to other various GPS-equipped products such as various information processing devices typified by car navigation systems, handy GPSs, portable personal computers, cell phones, and so on.

The present invention has been described in detail above with reference to a specific embodiment of the invention. It should be apparent that various modifications and substitutions might be incorporated into the embodiment by those skilled in the art without departing from the scope and spirit of the invention. That is, the embodiment of the invention has been disclosed merely for the purpose of exemplification, and should not be interpreted as a limitation to the scope of the invention. The appended claims should be consulted to determine the gist of the invention.

The series of processing described in the specification can be executed by hardware, software, or a complex configuration therebetween. If the processing is executed by software, a program in which the processing sequence is recorded can be installed for execution into a memory included in a computer and integrated in dedicated hardware. Alternatively, the program can be installed for execution into a general-purpose computer capable of executing various kinds of processing.

For example, the program can be recorded in a hard disc or read only memory (ROM) as a recording medium in advance. Alternatively, the program can be temporarily or permanently stored (recorded) in a removable recording medium such as a flexible disc, a compact disc read only memory (CD-ROM), a magneto optical (MO) disc, a digital versatile disc (DVD), a magnetic disc, or a semiconductor memory. Such a removable recording medium can be provided as so-called package software.

Instead of installing the program from a removable recording medium to a computer in the above-described manner, the program may be transferred to a computer from a download site via wireless connection or a wired network such as a local area network (LAN) or the Internet, so that the computer can receive the thus transferred program and can install it in a recording medium such as its built-in hard disc.

The various kinds of processing described in the specification may not only be executed time-sequentially in accordance with the description, but may also be executed in parallel or individually depending on the processing ability of the device to execute the processing or according to need. Furthermore, the term "system" in the present specification refers to a logical assembly entity of plural devices, and is not limited to an entity in which devices with the respective configurations are included in the same casing.

As described above, according to one embodiment of the invention, in an information processing device including a global positioning system (GPS) device, such as an imaging device typified by a video camera, the state of use of the information processing device by a user, such as the frequency of imaging by the imaging device, is monitored so that the use frequency per unit time is calculated. If the use frequency is lower than a predefined threshold value, power is intermittently supplied to the GPS device. Due to this configuration, unnecessary power consumption in the GPS device is prevented, which suppresses consumption of a battery. Furthermore, the intermittent driving of the GPS device makes it possible to maintain navigation messages, which are data received from GPS satellites, as ones within the validity period. Therefore, position calculation in a short period by use of the navigation messages is allowed without a new search for GPS satellites.

While preferred embodiments of the present invention have been described using specific terms, such description is for illustrative purpose only, and it is to be understood that changes and variations may be made without departing from the spirit or scope of the following claims.

The invention claimed is:

1. An information processing device, comprising:
a global positioning system (GPS) device configured to execute position calculation processing based on data received from a satellite;
a power supply controller configured to control power supply to the global positioning system device; and
a device controller configured to monitor a state of use of the information processing device by a user, to calculate a use frequency of the information processing device per unit time, and to cause the power supply controller to intermittently supply power to the global positioning system device if the calculated use frequency is lower than a predefined threshold value.

2. The information processing device according to claim 1, wherein the device controller is configured to cause the power supply controller to continuously supply power to the global positioning system device if the calculated use frequency is equal to or greater than the predefined threshold value.

3. The information processing device according to claim 1, wherein the device controller is configured to calculate an imaging frequency of an imaging device, to cause the power supply controller to intermittently supply power to the global positioning system device if the calculated imaging frequency is lower than a predetermined threshold value, and to cause the power supply controller to continuously supply power to the global positioning system device if the calculated imaging frequency is equal to or greater than the predetermined threshold value.

4. The information processing device according to claim 1, wherein the device controller is configured to periodically verify a validity period of an already acquired navigation message in the global positioning system device, and to cause the global positioning system device to execute a process of updating navigation data if the already acquired navigation message has expired.

5. The information processing device according to claim 1, wherein the device controller is configured to implement control so that a timing of resumption of power supply to the global positioning system device in an execution period of intermittent power supply to the global positioning system device is matched to a timing at which position information is input from the global positioning system device to the device controller.

6. The information processing device according to claim 1, wherein the device controller is configured to implement control so that a period shorter than a validity period of a navigation message is employed as a maximum duration of an OFF-state of a power supply of the global positioning system device in an execution period of intermittent power supply to the global positioning system device.

7. A power supply control method in an information processing device including a global positioning system (GPS) device, the method comprising:
monitoring a state of use of the information processing device by a user and calculating a use frequency of the information processing device per unit time; and
controlling power supply so that power is intermittently supplied to the global positioning system device if the calculated use frequency is lower than a predefined threshold value.

8. The power supply control method according to claim 7, wherein the controlling power supply step includes continuously supplying power to the global positioning system device if the calculated use frequency is equal to or greater than the predefined threshold value.

9. The power supply control method according to claim 7, wherein the controlling power supply step includes calculating an imaging frequency of an imaging device, intermittently supplying power to the global positioning system device if the calculated imaging frequency is lower than a predetermined threshold value, and continuously supplying power to the global positioning system device if the calculated imaging frequency is equal to or greater than the predetermined threshold value.

10. The power supply control method according to claim 7, further comprising:
periodically verifying a validity period of an already acquired navigation message in the global positioning system device, and causing the global positioning system device to execute a process of updating navigation data if the already acquired navigation message has expired.

11. The power supply control method according to claim 7, wherein the controlling power supply step includes matching a timing of resumption of power supply to the global positioning system device in an execution period of intermittent power supply to the global positioning system device to a timing at which position information is input from the global positioning system device to a device controller.

12. The power supply control method according to claim 7, wherein the controlling power supply step includes employing a period shorter than a validity period of a navigation message as a maximum duration of an OFF-state of a power supply of the global positioning system device in an execution period of intermittent power supply to the global positioning system device.

13. A computer program for causing execution of a power supply control method in an information processing device including a global positioning system (GPS) device, the power supply control method comprising:

monitoring a state of use of the information processing device by a user and calculating a use frequency of the information processing device per unit time; and controlling power supply so that power is intermittently supplied to the global positioning system device if the calculated use frequency is lower than a predefined threshold value.

* * * * *